Oct. 17, 1950     R. T. SAWYER ET AL     2,526,424
POWER PLANT
Filed May 7, 1946     7 Sheets-Sheet 1
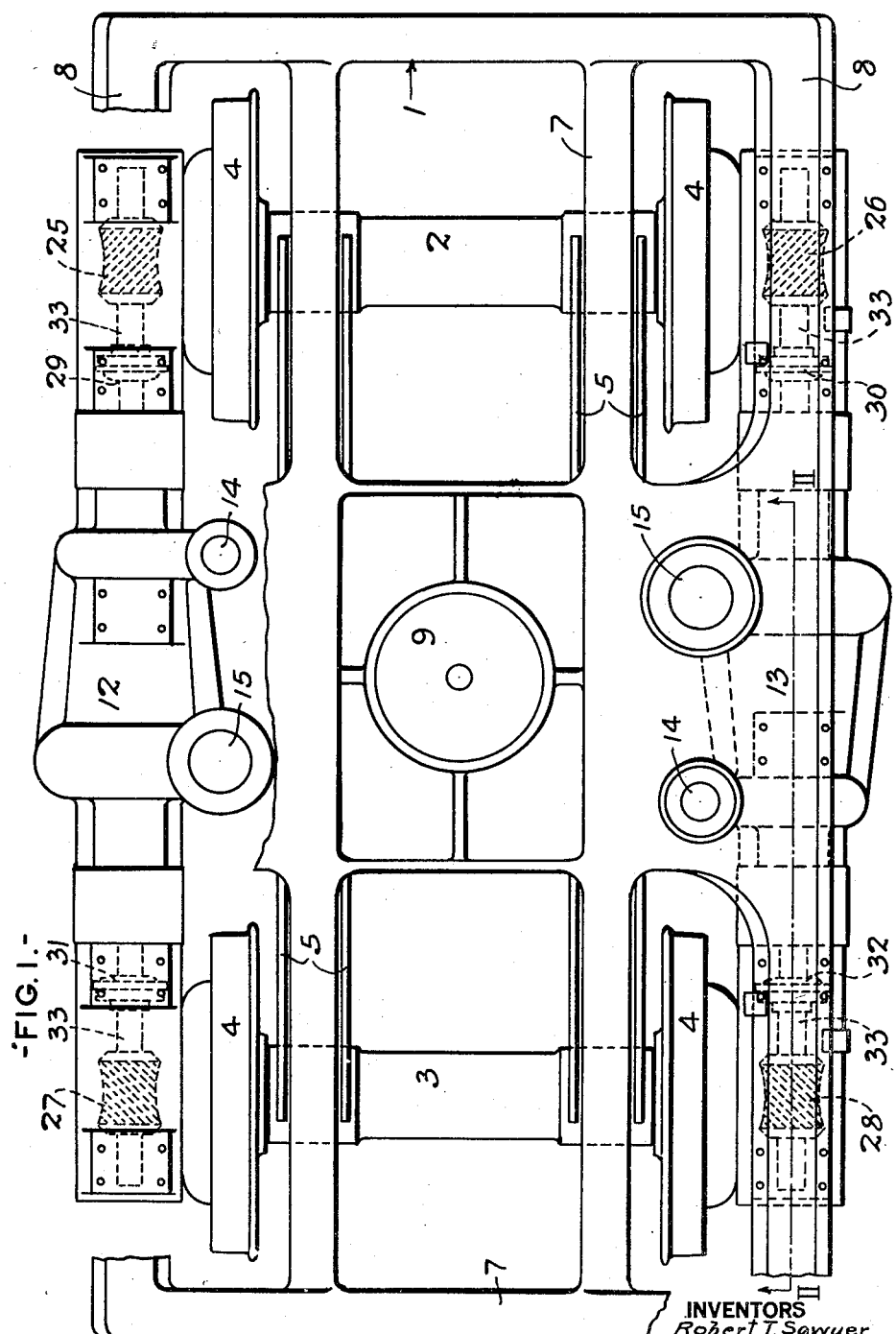
INVENTORS
Robert T. Sawyer
William L. Fischer
BY
S. C. Yeaton
ATTORNEY

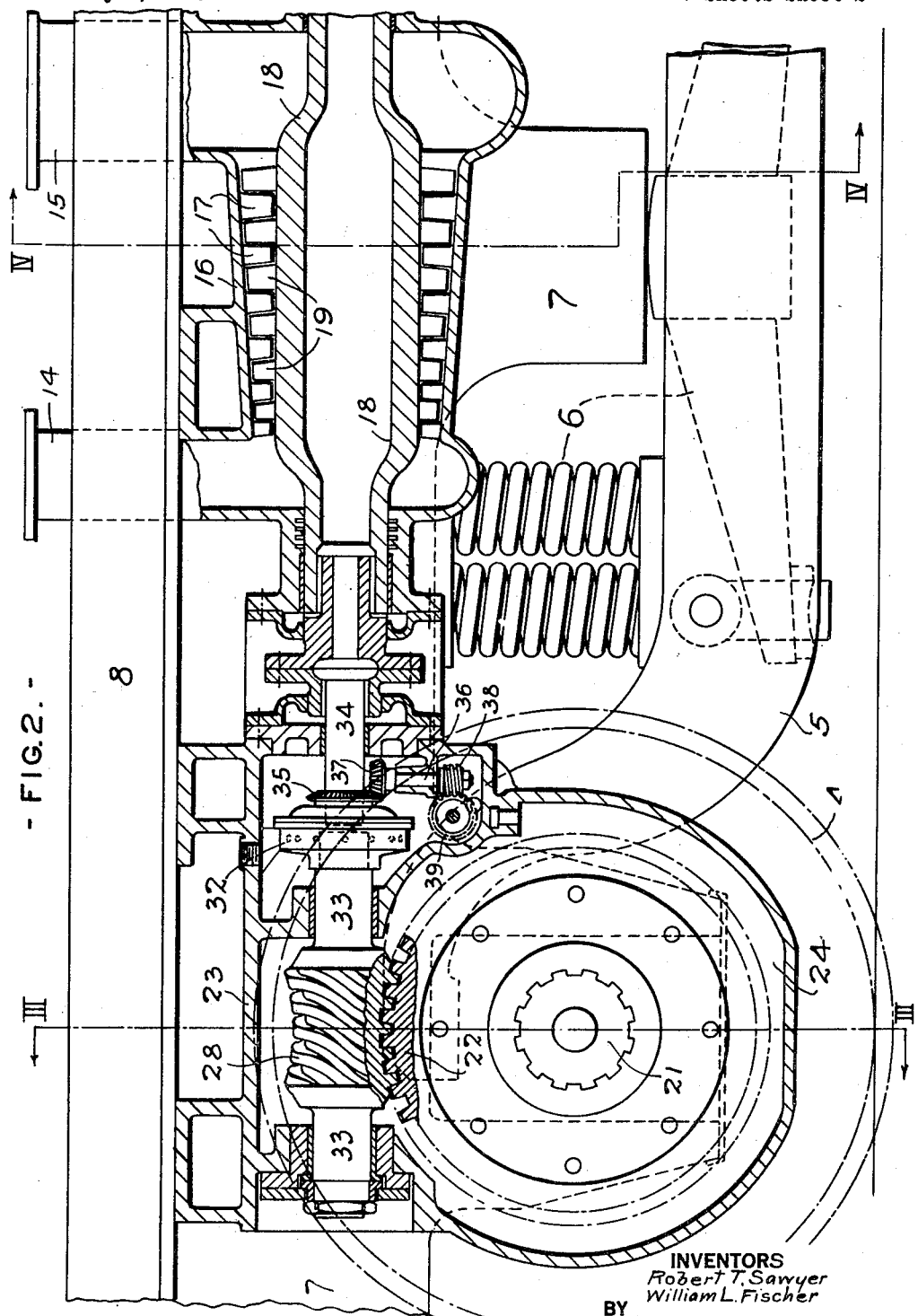

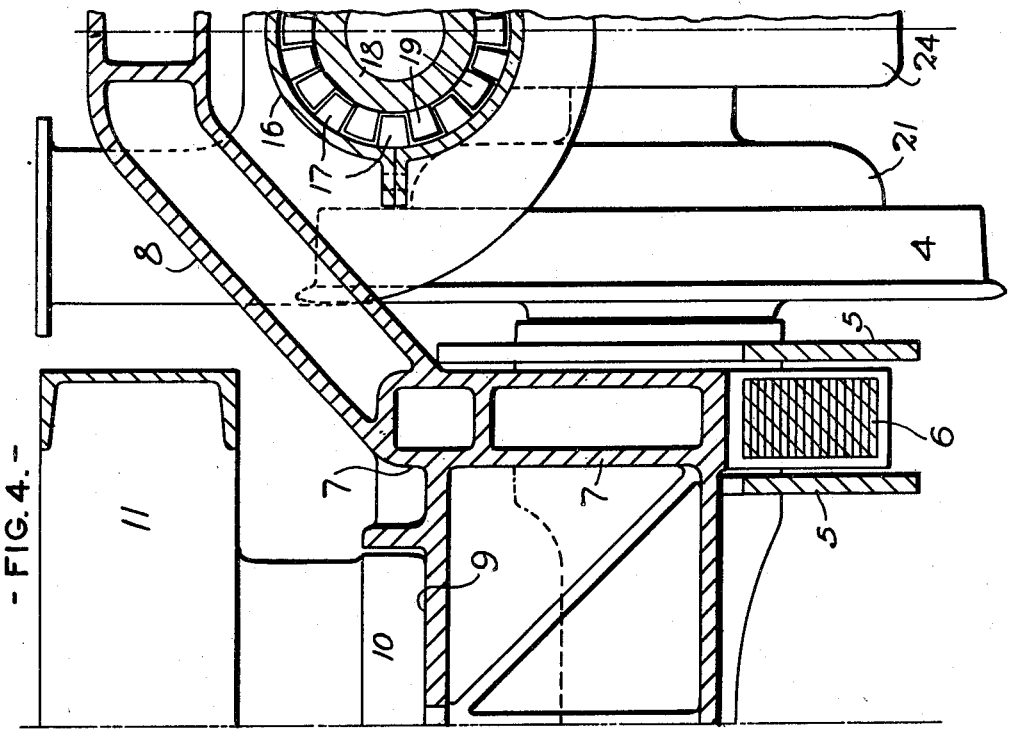
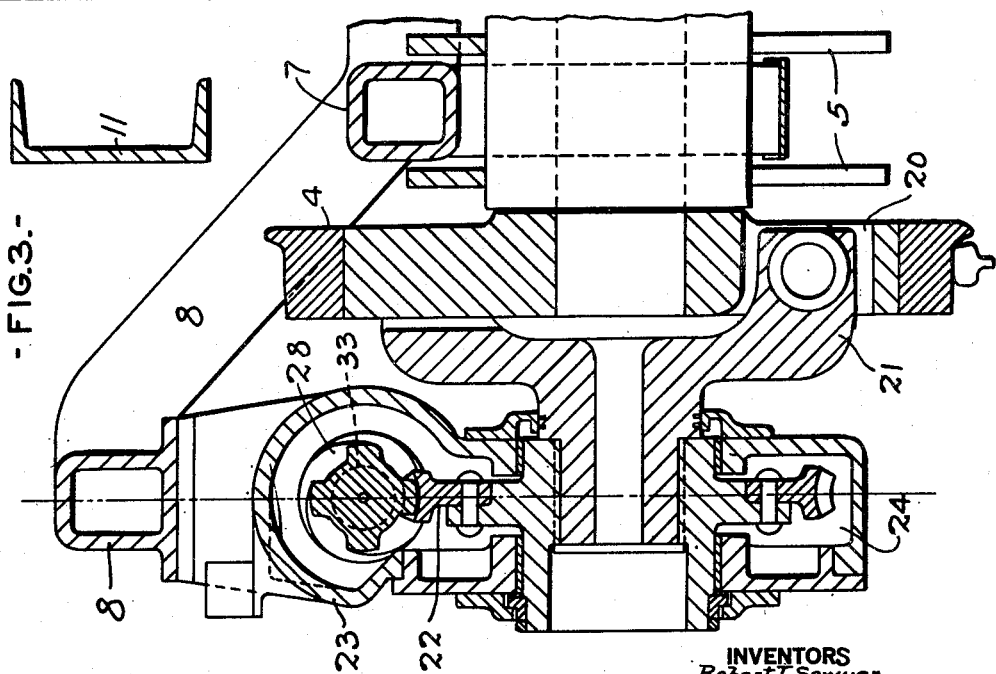

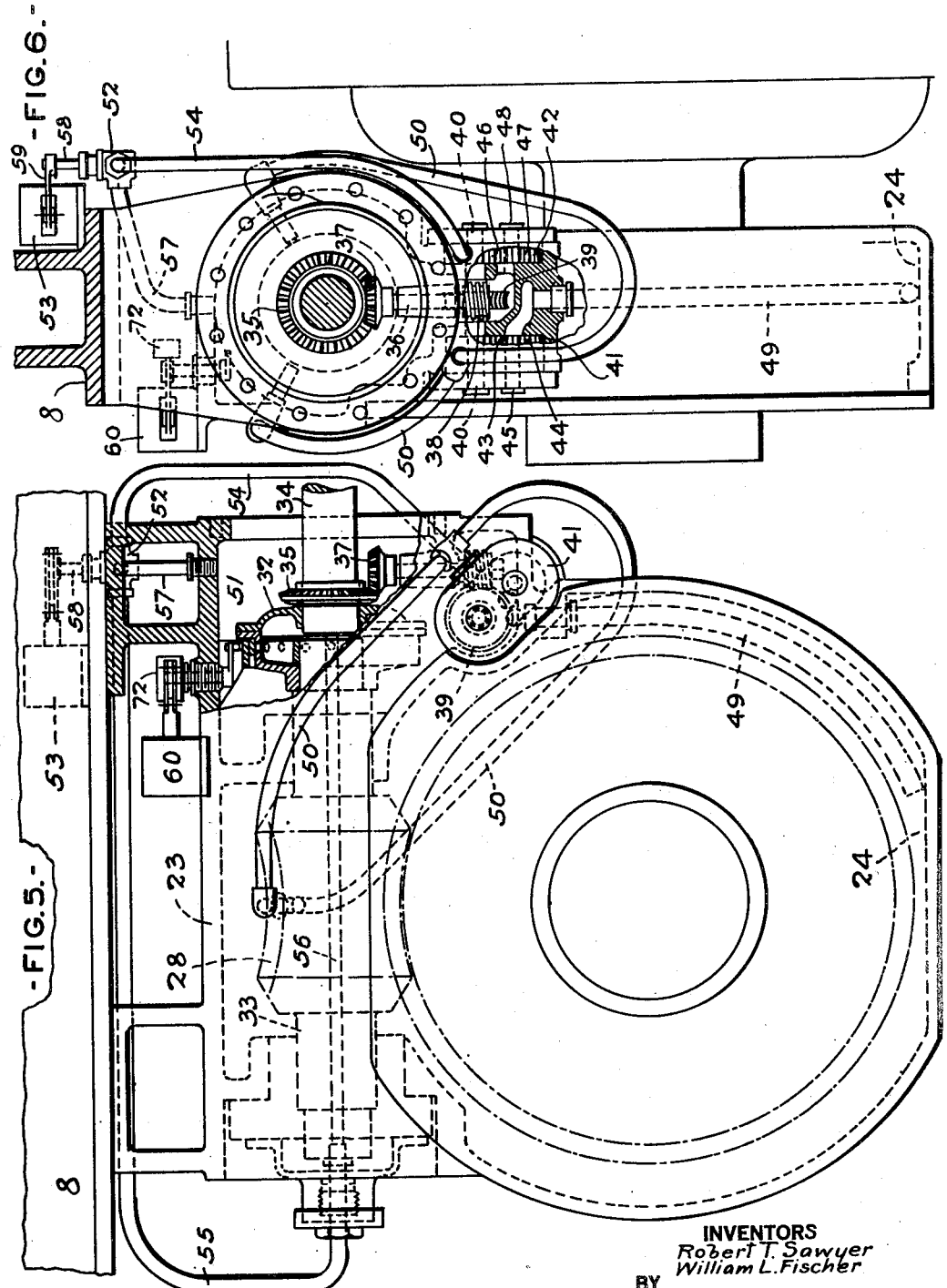

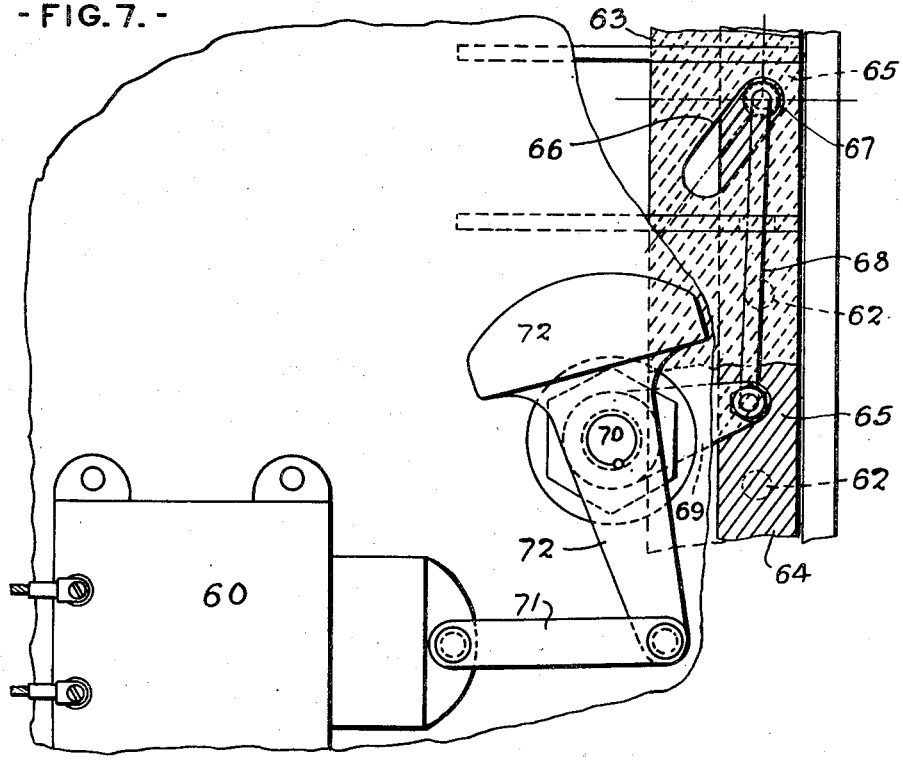
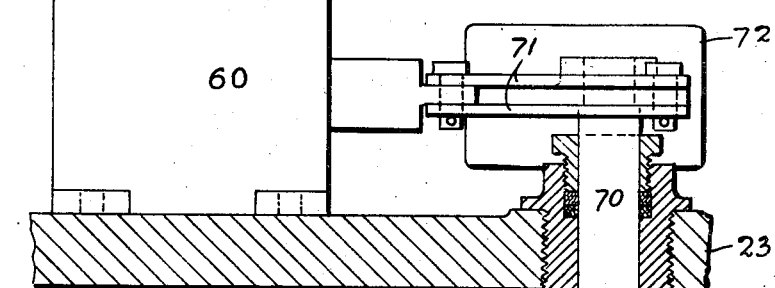
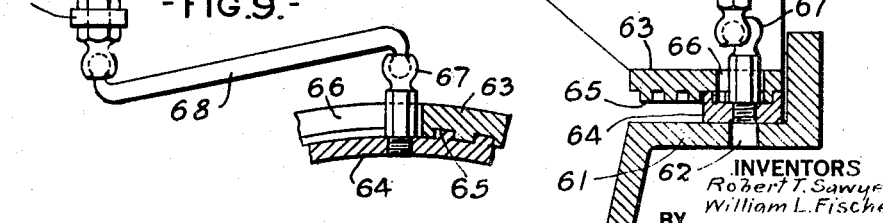

Oct. 17, 1950  R. T. SAWYER ET AL  2,526,424
POWER PLANT
Filed May 7, 1946  7 Sheets-Sheet 6
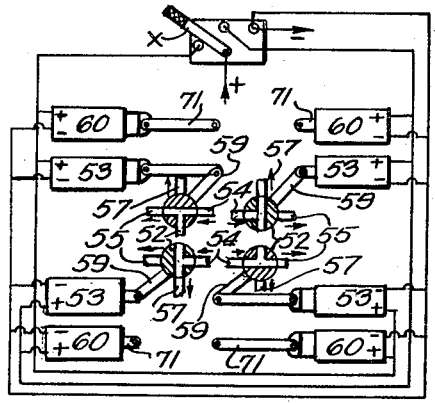
FIG.18.
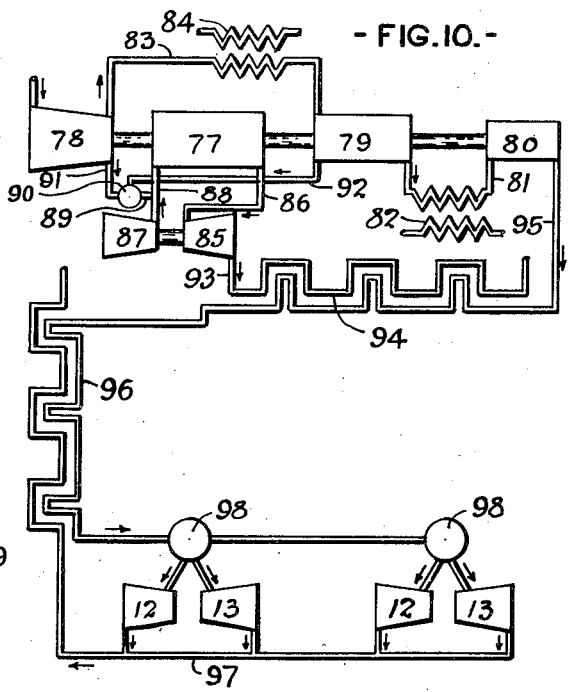
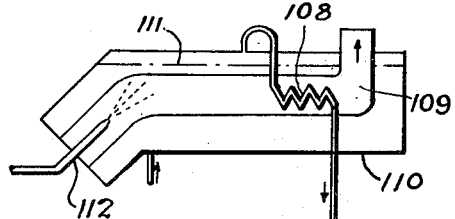
FIG.12.
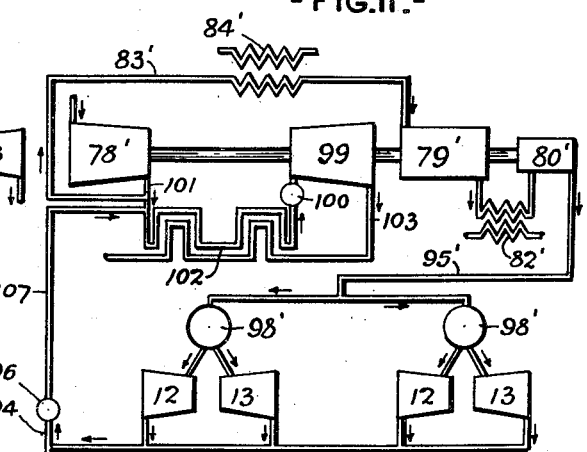
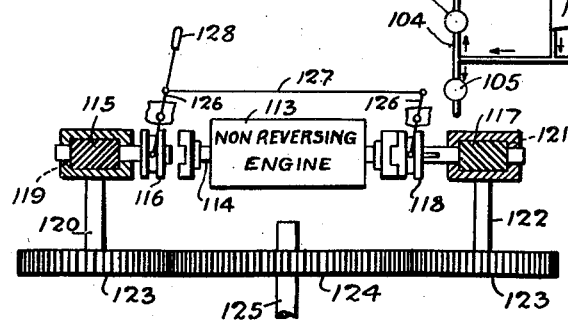
- FIG. 17. -
INVENTORS
Robert T. Sawyer
William L. Fischer
BY
E. C. Yeaton
ATTORNEY

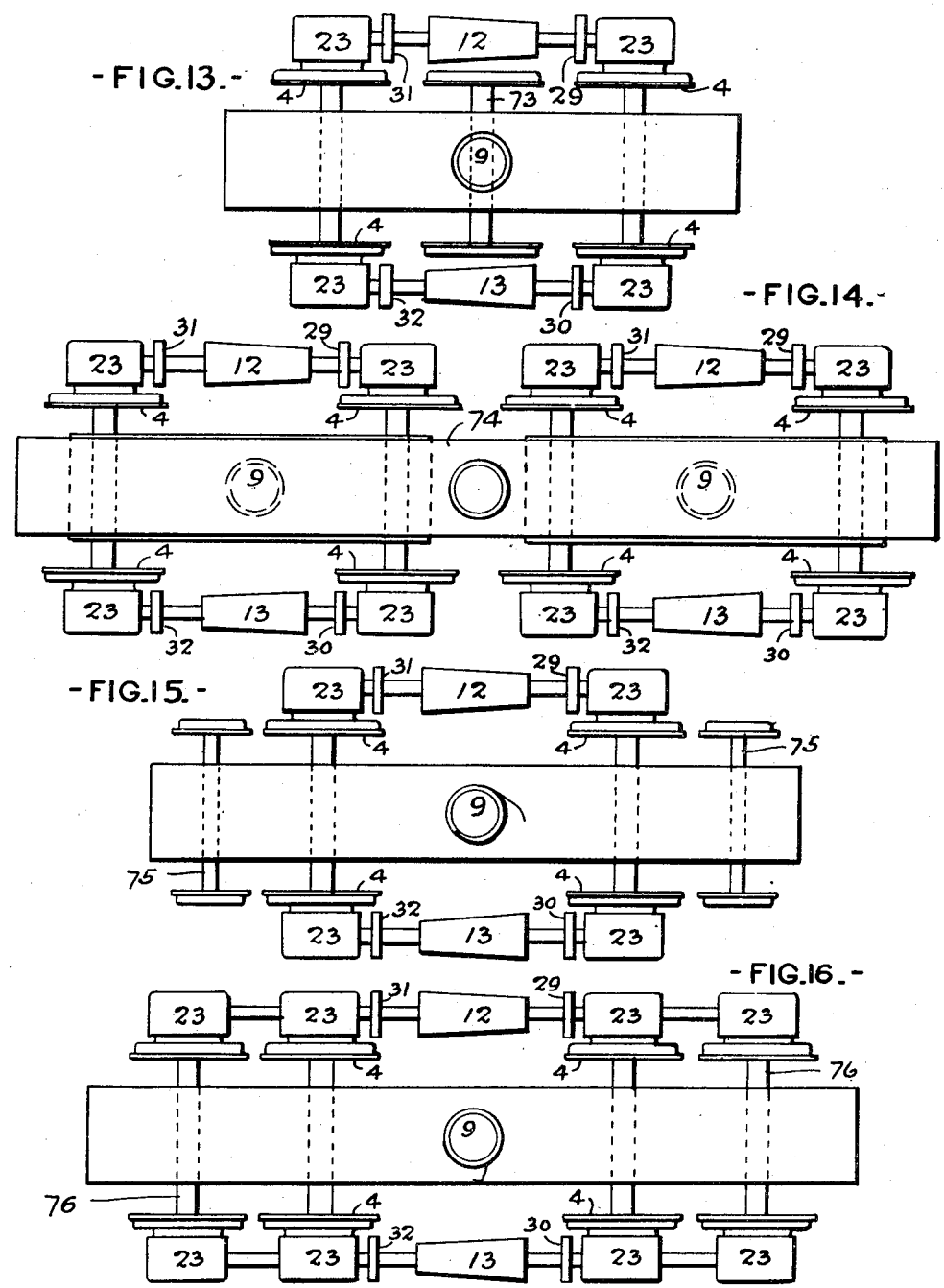

Patented Oct. 17, 1950

2,526,424

UNITED STATES PATENT OFFICE 2,526,424

POWER PLANT

Robert T. Sawyer, Hohokus, N. J., and William L. Fischer, Schenectady, N. Y., assignors to American Locomotive Company, New York, N. Y., a corporation of New York Application May 7, 1946, Serial No. 667,854

1 Claim. (Cl. 60—102)

This invention relates to a power plant.

An object of the present invention is to provide a power plant in which the driven means can be reversed without reversing the power engine.

Another object is to provide a power plant having a working fluid producer and turbines driven by the working fluid, the turbines being associated with two shafts through suitable disengageable clutches in such a manner that each turbine drives a different shaft during rotation of the shafts in one direction, and conversely drives the other shaft during rotation of the shafts in the opposite direction, the turbines being non-reversible.

Other and further objects of the invention will appear from the following description, the accompanying drawings and the appended claim.

Referring to the drawings forming a part of this application, Figure 1 is a plan view of a railway vehicle truck forming a part of a power plant constructed in accordance with the present invention, parts of the truck being broken away; Fig. 2 is an enlarged sectional view, taken on the line II—II of Fig. 1, of a portion of the truck, parts being shown in full and parts being omitted; Fig. 3 is a sectional view of a portion of the truck, taken on the line III—III of Fig. 2; Fig. 4 is another sectional view of another portion of the truck, taken on the line IV—IV of Fig. 2; Fig. 5 is an enlarged sectional view showing a portion of the truck including one hydraulic coupling and axle drive; Fig. 6 is a transverse sectional view as viewed from the right of Fig. 5; Fig. 7 is an enlarged fragmentary plan view, partly in section, showing a portion of the valve mechanism of one of the hydraulic couplings; Fig. 8 is a fragmentary elevational view of Fig. 7, partly in section; Fig. 9 is an enlarged fragmentary detail view showing a connecting link omitted in Fig. 8; Fig. 10 is a diagrammatic view of a power plant utilizing gas turbines in accordance with the present invention; Fig. 11 is a similar diagrammatic view of another form of gas turbine power plant; Fig. 12 is a diagrammatic view of a steam turbine power plant in accordance with this invention; Fig. 13 is a diagrammatic view of a six-wheel truck embodying the present invention; Figs. 14, 15 and 16 are diagrammatic views of three types of eight-wheel trucks embodying the present invention; Fig. 17 is a diagrammatic view of a power plant illustrating a principle of the present invention; and Fig. 18 is a view showing the control for the solenoids of the truck.

The present invention is directed toward employing engines to do work in a novel manner so that all of the engines employed in the system are at all times utilized and full torque effort may be applied to all of the shafts driven by the engines. The engines may be turbines. For example, it is well known to drive a shaft such as a ship's propeller shaft or the axle of a railway vehicle by a turbine power plant in which forward and reverse turbines are employed, the reverse turbines being idle during forward movement. The objection to such a system is that the reverse turbine is a machine which is seldom used and thus adds disproportionately to the original cost of, the space occupied by, and the maintenance of, the system.

The power system of the present invention contemplates employing, according to one embodiment of the invention, two parallel turbines between two shafts, one turbine being coupled to one shaft and the other turbine being coupled to the other shaft during rotation of the shafts in one direction. When it is desired to reverse the direction of rotation of the shafts, the turbines are disconnected from the aforesaid driven shafts and then connected each with the other shaft. The turbines are coupled to the shafts through suitable disengageable clutches such as hydraulic couplings and suitable gearing such as worm drives.

Taking a four-wheel railway vehicle truck as an example of a turbine power system employing two shafts, there will be a turbine at each side of the truck between the two wheeled axles thereof and the turbine rotor will be connected at each of its ends to a disengageable clutch, and each clutch will be connected to a worm shaft, the worms being oppositely directed to effect reversal. Each shaft is always driven by one or the other of the two turbines depending upon the direction of movement of the truck, and both turbines are always employed simultaneously and full tractive effort is applied to both of the railway vehicle truck axles. Thus an economical, compact turbine truck has been provided with a minimum of necessary parts. Furthermore, the turbines, couplings, and worm drives may be disposed exteriorly of the wheels of the truck where they afford maximum availability for inspection and repair.

The present invention has broad application to the driving of shafts by engines, but as it is particularly suitable for use in a railway vehicle it has been so shown in the drawings, and, for simplicity, the following description will be mainly limited to this embodiment of the invention, it being understood that, if desired, the two axles of the truck may be considered to be any two machine shafts. While hydraulic couplings are shown and described as a satisfactory type of disengageable clutch, other clutches may be employed if desired.

A four-wheel swivel-type railway vehicle truck 1 is shown in Figs. 1 to 9. Assuming the forward end of the truck to be at the right in Fig. 1, the truck has a front axle 2 and a rear axle 3, and wheels 4 are secured to the axles. Equalizers 5 bridge the axles and support the coil and leaf springs 6 on which the frame 7 of the truck is supported. The frame has longitudinal rails 8 exteriorly of the wheels 4 and a center plate 9 which receives the center pin 10 of the vehicle superstructure 11. The working fluid producer, later to be described, will be mounted on the superstructure 11. A turbine 12 is hung from the left rail 8 and a turbine 13 is hung from the right rail 8, between the axles 2 and 3, and these turbines are identical but reversely positioned. They may be driven by any suitable working fluid such as air, gas or steam. They are conventional turbines and no detailed description thereof is deemed necessary. Suffice it to say that they each have an inlet 14, an outlet 15, a casing 16 carrying stationary blades 17, and a rotary shaft 18 carrying blades 19.

Each of the wheels 4 is driven by a spring cup drive. Any suitable type of conventional spring cup drive may be employed and therefore the spring cup drive is not shown in detail in the drawings, but for a more complete understanding of same, reference may be had to Patent No. 2,182,942, which shows a spring cup drive suitable for the instant purpose. Suffice it to say that each wheel has an annular row of openings 20 which receive a spring cup drive member 21 secured to a worm wheel 22 journalled in a casing 23. The four casings 23 of the truck are secured to the rails 8 adjacent the wheels 4. These casings 23 are formed of several parts, as will presently appear, each worm wheel 22 being enclosed in a chamber 24.

The worm wheels are driven by worms. The worms 25 and 26 associated with the axle 2 are right hand worms, and the worms 27 and 28 are left hand worms, as may be seen in Fig. 1. Worms 25 and 27 are at the left side of the truck and worms 26 and 28 are at the right side of the truck.

Each worm is adapted to be connected to its turbine through a hydraulic coupling, the worms 25 to 28 being respectively associated with hydraulic couplings 29 to 32. Each hydraulic coupling includes a driven shaft 33 on which its worm is mounted, and a driving shaft 34 connected to its turbine. The manner of controlling the operation of the couplings will presently be described. They are controlled so that diagonally opposite couplings are operative at one time, the couplings 30 and 31 being filled with fluid and operating during forward motion of the truck, and the couplings 29 and 32 being filled with fluid and operating during reverse motion of the truck. The couplings which are not filled with fluid merely idle, and consequently their worms idle. Reversal of the truck is accomplished by employing a right hand and a left hand worm with each turbine. For example, considering only turbine 12 during forward motion, it drives axle 3 through a left hand worm but for reverse motion it drives axle 2 through a right hand worm. The worms must not be self-locking since they are driven, when idling, by their respective worm wheels 22.

The hydraulic couplings shown in the drawings are adapted to employ oil, and the worm and worm wheel drives are lubricated with oil. The lubrication oil differs from the coupling oil but the oil pumps for these two types of oil are commonly driven for compactness and simplicity. The oil systems associated with each wheel are similar, and therefore only one will be described, namely that shown in Fig. 2 wherein coupling 32 is shown. The hydraulic couplings are of the well-known Foettinger type, and no detailed description thereof is deemed necessary. Reference may be had to Patent No. 1,199,359 for a basic description of a hydraulic coupling which is suitable for the instant power plant.

Referring now to Fig. 2, it will be seen that driving shaft 34 carries a bevel gear 35 which drives a vertical shaft 36 through a bevel gear 37, shaft 36 being journalled in suitable bearings in casing 23. A worm 38 is secured to the bottom of shaft 36 and drives a worm wheel 39, as shown in Fig. 6. Worm wheel 39 is mounted on a horizontal shaft 40, and this shaft 40 is common to the lubricating oil pump 41 and the hydraulic coupling oil pump 42. Pumps 41 and 42 are gear type pumps. Pump 41 has a gear 43 on shaft 40 and a gear 44 mounted on a pin 45. Similarly pump 42 has a gear 46 mounted on shaft 40 and a gear 47 mounted on a pin 48 in line with pin 45.

The lubricating oil pump draws oil from the sump at the bottom of chamber 24 through a pipe 49 and pumps the oil through pipes 50 to opposite sides of the worm 28, from which the oil drips down onto the worm wheel 22 and eventually collects again in the sump of the chamber 24, whereupon the cycle is repeated. This lubricating oil is heavier than the hydraulic coupling oil.

Each hydraulic coupling is disposed in a chamber 51 formed in the casing 23, and the pump 42 is at the bottom of the chamber 51 and draws oil therefrom. Pumps 41 and 42 are always rotating and the worms and worm wheels are always being lubricated even when idling, which is desired. However, when the hydraulic coupling is idling it must be empty, but since the hydraulic coupling oil pump is always operating, this pump is provided with two pipe systems, one for delivering oil to the hydraulic coupling when the hydraulic coupling is to drive, and the other for by-passing the oil when the hydraulic coupling is to idle, and these pipe systems are controlled by a three-way valve 52 which is operated by a solenoid or suitable mechanism 53. The pump 42 pumps its oil to the three-way valve 52 through a pipe 54.

When the hydraulic coupling 32 is to drive, the three-way valve 52 is turned so that the oil is delivered through a pipe 55 to the outer end of shaft 33. The oil passes through an axial bore 56 in the shaft 33 into the hydraulic coupling 32, and any oil that leaks out of this coupling drips to the bottom of chamber 51 where it is received by the pump 42 and pumped back into the system. When the hydraulic coupling is to idle, it is opened by a valve mechanism, later to be described, so that it empties its oil into the chamber 51, and the three-way valve is then turned so that the oil being pumped through pipe 54 is returned to chamber 51 through a by-pass pipe 57 so that a by-pass cycle is established without any oil being delivered to the hydraulic coupling.

The solenoid 53 may be of the usual push-pull type operating the stem 58 of the valve 52 by means of an arm 59 on the stem. Another solenoid 60 of the same type as solenoid 53 is employed for controlling the valve mechanism of each hydraulic coupling. Thus there are four solenoids 53 and four solenoids 60, and all of the solenoids may be of the same type. The solenoids are merely shown diagrammatically as any suitable conventional type may be employed, and the particular construction of the solenoids forms no part of the present invention.

The hydraulic couplings are similar and each has a similar valve mechanism, best shown in Figs. 7 to 9. Each coupling has a cylindrical wall 61 provided with a row of ports 62. A stationary ring 63 surrounds wall 61 in spaced relation therewith, and a ring-shaped valve 64 is mounted on the wall 61 in this space. Valve 64 and ring 63 have oblique coacting teeth 65. At its top, ring 63 is provided with a slot 66 which is oblique similar to the teeth 65, and a post 67 is disposed in this slot and secured to the valve 64. This post 67 is connected, by a universal link 68, to an arm 69 secured to a vertical shaft 70 journalled in a wall of the casing 23. Solenoid 60 is connected by means of a link 71 to a counterweighted lever arm 72 secured to the top of the shaft 70. The solenoid is adapted to move valve 64 to open and close the ports 62. The solenoid circuit is shown in Fig. 18. In one position of the switch X electric current is transmitted to the solenoids 53 and 60 of the diagonally opposite fluid couplings 31 and 30, moving the plungers of the solenoids outwardly. Current is thereby cut off from the other solenoids, permitting retraction of their plungers. Movement of the switch X to its other operative position reverses this, transmitting current to the solenoids 53 and 60 of the diagonally opposite fluid couplings 29 and 32.

The operation of the truck is as follows:

For forward motion the solenoids 60 at the upper right and lower left of Fig. 18 are actuated by a positive electric charge so that the ports 62 of hydraulic couplings 30 and 31 are closed and their three-way valves are turned by the solenoids 53 at the upper right and lower left of Fig. 18 so that oil will be delivered to the couplings 30 and 31, whereas the ports 62 of couplings 29 and 32 are open since electricity has been cut off from their solenoids 60 and their three-way valves are turned by their solenoids 53, from which electricity has been cut off, so that the oil will circulate through the by-pass circuits, leaving the couplings 29 and 32 empty and cut off from the source of oil supply. Therefore turbine 12 will drive axle 3 and turbine 13 will drive axle 2 in a forward direction, the turbines thus rotating in opposite directions since they are oppositely positioned, and this being corrected at the axles by the fact that turbine 12 is driving a left hand worm while turbine 13 is driving a right hand worm. All four lubricating oil pumps pump oil to all four worms in the manner aforedescribed while the hydraulic coupling pumps pump oil through the pipes 55 of couplings 30 and 31, and through the pipes 57 of couplings 29 and 32.

To reverse the truck, the switch X is moved to its other position and all of the solenoids are actuated, the solenoids of couplings 29 and 32 being actuated by a charge of electricity and the solenoids of couplings 30 and 31 being actuated by retraction of their plungers due to the cut-off of electrical current thereto. Ports 62 of couplings 30 and 31 are opened, and the oil is thrown out of these couplings centrifugally into their chambers 51. Then the ports 62 of the couplings 29 and 32 are closed, and these couplings are filled with oil pumped through their associated pipes 55. The turbine 12 then drives the right hand worm 25 while the turbine 13 drives the left hand worm 28 and the axles 2 and 3 are driven in the reverse direction.

It will be obvious from the foregoing description of the structure of this embodiment of the invention that many desirable features are obtained when the present invention is applied to a vehicle truck. The disposition of the turbines, hydraulic couplings, and worm gear drives exteriorly of the wheels 4 permits of their ready inspection and repair without disturbing other elements of the truck, and the spring cup drives permit the turbines to be mounted for vertical movement relative to the axles without interfering with the driving thereof.

The source of working fluid for the turbines can be piped to the turbines through flexible conduits, leaving the truck free to swivel about the axis of the center plate 9. The employment of non-reversible turbines with couplings and reverse worms for effecting reversal of the truck eliminates shifting transmissions and permits the use of turbines of simpler construction and less bulk. Furthermore, the use of two turbines as described to obtain the aforesaid benefits also eliminates the necessity of one large turbine which could not be employed on a railway vehicle truck where clearances are determined by other factors. The positive driving of both truck axles provides for full tractive effort of all of the truck wheels, and the switchable arrangement of the turbines with the axles permits full use of all power turbines and eliminates the need for an idling turbine such as a reverse turbine.

The full tractive effort above mentioned of the wheels is true for both forward and reverse movement. The disposition of the turbines on the truck frame permits the use of vehicles with swivel trucks rather than with a rigid wheel base. The turbines with their couplings and gear boxes are all mounted on a rigid frame and the drive is effected without the use of universal joints. It is estimated that transmission efficiency will be higher than for an electric drive, with 98% efficiency of the hydraulic couplings and 94% efficiency of the worm gear drives, or a total of 92% for the transmission's efficiency.

In a four-wheel railroad truck of the type using conventional 42" wheels and a suitable wheel base, two 750 H. P. turbines can be employed. In order to produce the desired starting torque with the fixed speed ratio direct drive of the present invention, it is desirable to get a high (above 150 pounds per square inch) pressure drop across the truck turbines, and the present invention is adapted to meet this important requirement. Suitable cycles for this purpose will be later described. The exhaust from the turbines may be to the atmosphere or may be conducted through auxiliary equipment such as a regenerator.

The truck can be brought into motion from a standing position by employing the turbines as starters, the principle being the same as that employed with inertia starters used on airplane engines, that is to say, the moment of inertia of the turbine rotors can be used to assist the starting of the truck by bringing the turbine up to full speed before oil is admitted to the couplings. After the turbines are up to full speed the three-way valves of the two couplings to be employed may be turned to admit oil to the couplings slowly so that a high starting slip is produced during the starting period, and this will have a benefit on the starting torque as the axles are brought into motion by the turbines. Except for coupling slip, which is at most temporary, the gear ratio between the turbines and the wheels is constant. There is no shifting of gears.

The oil which is admitted to the operative hydraulic couplings also aids in cooling these couplings since there will be some leakage from the couplings and this will be constantly replaced by the permanently running pumps. That is to say, the valve 64 will be loosely fitting to permit the casing of the hydraulic coupling to rotate therein and to permit a certain amount of leakage for this cooling purpose.

In Figs. 13 to 16 the invention is shown applied to other trucks than a four-wheel truck, but in each case the aforedescribed construction is employed.

In the six-wheel truck of Fig. 13 the four-wheel system similar to that of Fig. 1 is employed with an idling axle 73 disposed between the two driven axles.

In Fig. 14 two four-wheel systems are connected by a swing bolster 74.

In Fig. 15 one four-wheel system is employed and idling axles 75 are disposed outwardly therefrom.

In Fig. 16 instead of the idling axles 75, axles 76 are employed which are worm driven from extensions of the worm shafts of the four-wheel system. Parts shown in Figs. 13 to 16 corresponding to parts of the truck shown in Figs. 1 to 9 are indicated by like reference numerals.

Fig. 10 is a Diesel power plant with pneumatic drive, and Fig. 11 shows a gas turbine power plant. Fig. 12 shows a steam turbine power plant. All are suitable for use with the truck shown in Figs. 1 to 9. In each of these figures two trucks are indicated by the turbines 12 and 13 since a locomotive usually employs two trucks.

The power plant of Fig. 10 includes a Diesel engine 77 which drives compressors 78, 79 and 80. Compressors 79 and 80 are connected by a conduit 81 which passes through an intercooler 82. The compressor 78 is connected to the compressor 79 by a conduit 83 which passes through an intercooler 84. The Diesel engine 77 exhausts to a gas turbine 85 through a pipe 86 and the turbine 85 in turn drives a blower 87 which supplies the Diesel engine 77 with supercharging and scavenging air through a pipe 88.

In order to start the Diesel engine 77 air is supplied thereto through the pipe 88, this pipe 88 being connected by a pipe 89 to a starting valve 90 which receives air either from the compressor 78 through a pipe 91 or from the compressor 79 through a pipe 92 as desired. The exhaust from the gas turbine 85 is carried off through a pipe 93 passing through a reheater 94. The air from the final compressor 80 is conducted through a pipe 95 to the reheater 94 and then through another reheater 96, this reheater 96 receiving hot gas from a pipe 97 which is connected with the exhausts of the power turbines 12 and 13.

Two pairs of turbines 12—13 are shown in Fig. 10, and it will be understood, as aforesaid, that each pair represents the turbines of the four-wheel truck of Figs. 1–9. Thus on a locomotive of the type similar to the conventional Diesel electric locomotive now in use employing two swivel type four-wheel trucks, the four power turbines 12—13 of Fig. 10 would constitute the motive machinery of the four-wheel trucks. The turbines 12 and 13 receive their working fluid from pipe 95 after it has passed through the reheaters 94 and 96 and after it has been converted into combustion gas by fuel burners 98, there being a fuel burner 98 for each truck, that is for each pair of turbines 12—13. The fuel burners may be any well-known type of small furnace receiving hot compressed air from pipe 95, and burning fuel in it to raise its temperature.

The power plant shown in Fig. 11 employs a turbine 99 in place of the Diesel engine 77. The turbine 99 drives compressors 78', 79' and 80'. Pipe 95' passes directly to the furnaces 98' and turbines 12 and 13 instead of passing through reheaters. Turbine 99 is provided with a fuel burner or furnace 100 which receives compressed air from the blower 78' through a pipe 101 which passes through a reheater 102, the exhaust from turbine 99 being conveyed to the reheater through a pipe 103. Pipe 83' connecting compressor 78' with compressor 79' branches off pipe 101. Pipe 97' conducting off the exhaust gases from turbines 12 and 13 is connected to a pipe 104 disposed between two valves 105 and 106. When valve 106 is closed and valve 105 is open the gas from pipe 97' will pass to the atmosphere. When valve 105 is closed and valve 106 is open the gas will be conveyed through a pipe 107 to pipe 101 and will then be conveyed to the turbine 99. Intercoolers 82' and 84' are employed and located similar to their location in the power plant of Fig. 10.

A steam power plant is shown in Fig. 12, the turbines 12 and 13 here being steam turbines and receiving steam from the superheater 108 disposed in the flue 109. The liquid level of the boiler 110 is indicated by the dot and dash line 111 and the fuel burner by the numeral 112.

Fig. 17 shows diagrammatically a power plant illustrating one principle of operation according to the present invention. A non-reversing engine 113 has a shaft 114 which is adapted to be coupled to the left hand worm 115 by a clutch 116, or to the right hand worm 117 by the clutch 118 as desired. Worm 115 drives a worm wheel 119 on shaft 120 and worm 117 drives a worm wheel 121 on shaft 122. Shafts 120 and 122 carry gears 123 which mesh with an intermediate gear 124 mounted on a driven shaft 125. The operating levers 126 of the clutches are connected by a link 127 for simultaneous action in response to movement of the handle 128.

The shaft 114 always rotates in the same direction. Since clutch 118 is closed and clutch 116 is open the shaft 125 will be driven by means of the shaft 122 in one direction, shaft 120 being driven through the gears 123 and 124. To reverse the direction of rotation of shaft 125, handle 128 is swung to the left to close clutch 116 and open clutch 118 whereupon the non-reversing engine drives shaft 120, and shaft 122 is driven through the gears 123 and 124. Thus shaft 125 is reversible even though the shaft 114 is not reversible.

Engine 113 may be, for example, turbine 12, in which case clutches 116 and 118 correspond to hydraulic couplings 31 and 29 respectively, worms 115 and 117 correspond to worms 27 and 25 respectively, and shafts 120 and 122 correspond to axles 3 and 2 respectively.

While there have been hereinbefore described approved embodiments of this invention, it will be understood that many and various changes and modifications in form, arrangement of parts and details of construction thereof may be made without departing from the spirit of the invention, and that all such changes and modifications as fall within the scope of the appended claim are contemplated as a part of this invention.

The invention claimed and desired to be secured by Letters Patent is:

A power plant comprising two parallel driven shafts; an engine between said shafts having a non-reversible driving shaft; a fluid coupling connected to each end of said engine shaft; a worm connected to each of said fluid couplings, said worms being oppositely threaded; flexible means connecting each of said worms to one of said driven shafts; a pump unit adjacent each of said fluid couplings including two gear pumps having a common shaft; means for driving each of said common shafts; a pipe for conducting lubricating oil from one of said gear pumps of each of said units to its correlated worm for lubricating same; a pipe for conducting fluid from the other of said gear pumps of each of said units to its hydraulic coupling; a by-pass circuit in each of said last mentioned fluid-conducting pipes for by-passing its correlated fluid coupling; and control means for selectively rendering one of said couplings operative and the other inoperative by effecting delivery of fluid to said one of said couplings while simultaneously by-passing fluid around said other of said couplings whereby said engine operates to selectively drive one of said shafts in one direction and the other of said shafts in the other direction.

ROBERT T. SAWYER.
WILLIAM L. FISCHER.

REFERENCES CITED

The following references are of record in the file of this patent:

UNITED STATES PATENTS

| Number | Name | Date |
|---|---|---|
| 465,592 | Evans | Dec. 22, 1891 |
| 1,041,867 | Pieper | Oct. 22, 1912 |
| 1,501,604 | Kohler | July 15, 1924 |
| 1,750,559 | Adams | Mar. 11, 1930 |
| 1,813,543 | Pescara | July 7, 1931 |
| 2,107,689 | Bugatti | Feb. 8, 1938 |
| 2,182,942 | Gee | Dec. 12, 1939 |
| 2,213,349 | Seibold | Sept. 3, 1940 |

FOREIGN PATENTS

| Number | Country | Date |
|---|---|---|
| 161,308 | Germany | June 27, 1905 |
| 395,452 | Great Britain | July 20, 1933 |